(12) United States Patent
Kephart

(10) Patent No.: US 11,281,909 B2
(45) Date of Patent: Mar. 22, 2022

(54) SYSTEM AND METHOD FOR ANALYZING GRAFFITI AND TRACKING GRAFFITI VANDALS

(71) Applicant: Timothy Kephart, Omaha, NE (US)

(72) Inventor: Timothy Kephart, Omaha, NE (US)

(*) Notice: Subject to any disclaimer, the term of this patent is extended or adjusted under 35 U.S.C. 154(b) by 0 days.

(21) Appl. No.: 16/510,681

(22) Filed: Jul. 12, 2019

(65) Prior Publication Data

US 2019/0340436 A1 Nov. 7, 2019

(51) Int. Cl.
| | |
|---|---|
| *G06K 9/00* | (2006.01) |
| *G06F 16/583* | (2019.01) |
| *G06K 9/46* | (2006.01) |
| *G06Q 50/26* | (2012.01) |
| *G06F 16/587* | (2019.01) |

(52) U.S. Cl.
CPC ....... *G06K 9/00677* (2013.01); *G06F 16/587* (2019.01); *G06F 16/5854* (2019.01); *G06K 9/46* (2013.01); *G06Q 50/26* (2013.01)

(58) Field of Classification Search
CPC .... G06K 9/00677; G06K 9/46; G06K 9/0053; G06F 16/5854; G06F 16/587; G06Q 50/26
See application file for complete search history.

(56) References Cited

U.S. PATENT DOCUMENTS

| | | | | |
|---|---|---|---|---|
| 5,528,220 A | * | 6/1996 | Woods ................... | G08B 15/00 340/540 |
| 5,675,318 A | * | 10/1997 | Hunt, Jr. ................ | G08B 15/00 222/153.11 |
| 5,855,297 A | * | 1/1999 | Tichenor .............. | B65D 83/262 222/61 |
| 6,288,643 B1 | * | 9/2001 | Lerg ....................... | B60C 23/06 340/540 |

(Continued)

OTHER PUBLICATIONS

Graffiti Tracker: An Evaluation of the San Diego County Multi-Discipline Graffiti Abatement by Cynthia Burke, et al. Jun. 2012; published by SAN DAG (The San Diego Association of Governments) (Year: 2012).*

(Continued)

*Primary Examiner* — Wesley J Tucker
(74) *Attorney, Agent, or Firm* — Bayramoglu Law Offices LLC

(57) ABSTRACT

Exemplary embodiments of the present disclosure are directed towards a system for analyzing graffiti content, tracking graffiti vandals who executed graffiti on different surfaces and report the graffiti vandal reports to law enforcement agent or public works departments, comprising: a computing device is configured to allow a user to capture graffiti executed on a plurality of surfaces and uploads the captured graffiti to a graffiti analyzing and tracking module, the graffiti analyzing and tracking module parses out the graffiti content into data points and analyzes, reconfigures, (Continued)

and reports the data points to clearly reveal trends in categories on computing device, and a database configured to store information about graffiti crimes, locations, and allows the user to allocate resources, the computing device enables the graffiti analyzing and tracking module to display graffiti vandals and map the graffiti content to graffiti vandals that have appeared in graffiti renderings from the database.

20 Claims, 11 Drawing Sheets

(56) References Cited

U.S. PATENT DOCUMENTS

| | | | |
|---|---|---|---|
| 9,624,674 B2* | 4/2017 | Lee | E04F 13/0862 |
| 2006/0159308 A1* | 7/2006 | Hampapur | G06T 3/4038 |
| | | | 382/103 |
| 2015/0288152 A1* | 10/2015 | Hartman | H02B 7/06 |
| | | | 29/428 |
| 2019/0187811 A1* | 6/2019 | Hawkins | G06F 3/02 |

OTHER PUBLICATIONS

"Tracking Graffiti One Tag at a Time" published on YouTube on Sep. 8, 2010 by San Diego County. Web link: https://youtu.be/0ffEF-A9Ulc (Transcript included) (Year: 2010).*

"Region: North County law enforcement sign up for Graffiti Tracker" by Sarah Gordon, published in San Diego Union-Tribune, Jan. 25, 2009. Web link: https://www.sandiegouniontribune.com/sdut-region-north-county-law-enforcement-sign-up-for-2009jan25-story.html (Year: 2009).*

* cited by examiner

SYSTEM AND METHOD FOR ANALYZING GRAFFITI AND TRACKING GRAFFITI VANDALS

CROSS-REFERENCE TO RELATED APPLICATIONS

This patent application claims priority benefit of U.S. Provisional Patent Application No. 62/696,984, entitled "Means and Methods of Encoding Gang Communication and Analysis of Graffiti Messages", filed on 12 Jul. 2018. The entire contents of the patent application is hereby incorporated by reference herein in its entirety.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

TECHNICAL FIELD

The disclosed subject matter relates generally to analysis of graffiti work. More particularly, the invention relates to a system and method for analyzing graffiti such as graffiti content and tracking vandals who executed graffiti on different surfaces.

BACKGROUND

Generally, common outdoor areas such as freeway sound walls, freeway signs, buildings, tunnels, bridges, and other similar structures are at risk from being defaced by taggers. Taggers are individuals who mark different surfaces i.e., surfaces of walls and buildings with graffiti by spray painting onto the different surfaces. Such drawing and/or writing greatly diminishes the value of the private or public property. Graffiti is a constant problem within any city, large or small. Generally, there are four main types of graffiti: gang, ideological, spontaneous and tagger. Of these four, of most concern to law enforcement in terms of day-to-day operations is tagger and gang graffiti. So far, the only way to correct graffiti is after the event has occurred. Once a structure has been tagged, the municipality arranges to either have the graffiti erased or have the structure painted to cover the graffiti. Such procedures very expensive for the municipality. Nowadays, countless acts of graffiti are causing damages to both public property and private property alike. Catching a graffiti vandal is difficult as the graffiti-making act usually occurs late at night, low-light locations, remote locations, and so forth.

In general, graffiti gang members are known to attempt to encrypt graffiti messages with such messages intended for transmission between members of the graffiti vandal's gang or members of other rival vandal gangs. By having quick access to a particular tagger or graffiti of a known gang, patterns of communication can be viewed in sequence for ease of decoding. The computing devices may be configured to analyze the uploaded media content and give analyzed results to the users using various techniques. Although, various techniques have been developed for extraction, storage, and analysis of media content on the computing devices, these techniques are unable to provide results in an efficient manner. Existing prior art fails to provide a careful review of graffiti to ascertain the type of graffiti presented. Computing devices are connected to a network and allow the users to upload the graffiti content such as graffiti images, graffiti videos, information, files, animated images, documents, text advertisements, and so forth. Moreover, the existing prior art cannot decode the graffiti messages. The known related art fails to anticipate or disclose the principles of the present invention. The prior art fails to teach, suggest or anticipate means or methods of analyzing graffiti vandals and mapping graffiti to the graffiti vandals and their movements.

In the light of the aforementioned discussion, there exists a need for a certain system with novel methodologies that would overcome the above-mentioned disadvantages.

SUMMARY

The present invention overcomes shortfalls in the related art by presenting an unobvious unique combination and configuration of methods and components to accept data in the form of text and pictures and to correlate and analyze such data to detect trends in the graffiti and graffiti vandal activity.

An objective of the present disclosure is directed towards a system to assist law enforcement agencies and other entities to identify graffiti vandals, track the ongoing crimes, prosecute and seek restitution from such graffiti vandals.

Another objective of the present disclosure is directed towards the system is used by the law enforcement and public works agencies as well as the private sector in such uses as predicting trends in real property values, movements of graffiti vandal(s) and in social studies.

Another objective of the present disclosure is directed towards the system creates, displays and use of reports with such reports detailing a suspect's moniker(s), their total acts of known vandalism, square footage of vandalism and with graffiti content of vandalism.

Another objective of the present disclosure is directed towards the system mapping of reported graffiti correlated with a graffiti vandal showing graffiti vandal(s) movements and other criminal activity information, based in part, upon the type, placement and content of the reported graffiti.

Another objective of the present disclosure is directed towards the system tracks taggers or other persons who apply the graffiti but who are not necessarily affiliated with any criminal organization or criminal activity beyond vandalism.

Another objective of the present disclosure is directed towards the system to facilitate reporting by individuals or agencies via uploads of graffiti related information and have such information parsed out into a plurality of data points.

In an embodiment of the present disclosure, the system comprising a computing device is configured to allow a user to capture graffiti executed on a plurality of surfaces and uploads the captured graffiti to a graffiti analyzing and tracking module.

In another embodiment of the present disclosure, the graffiti analyzing and tracking module parses out the graffiti content into a plurality of data points and then analyzes, reconfigures, and reports the plurality of data points to clearly reveal trends in one or more categories on the computing device.

In another embodiment of the present disclosure, the system further comprising a database configured to store information corresponding to at least one of: different graffiti renderings; graffiti crimes; locations; and allows the user to allocate resources, the computing device enables the graffiti analyzing and tracking module to display one or more graffiti vandals and map the graffiti content to the one or more graffiti vandals that have appeared in the different graffiti renderings from the database, wherein the mapping of graffiti content correlated with a graffiti vandal showing the graffiti vandal's movements and other criminal activity information by the graffiti analyzing and tracking module.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

FIG. 1 depicts a schematic representation of the system for graffiti content, tracking graffiti vandals who executed the graffiti on different surfaces and report the graffiti vandal reports to law enforcement agent or public works department, in accordance with one or more exemplary embodiments.

Figure 1:
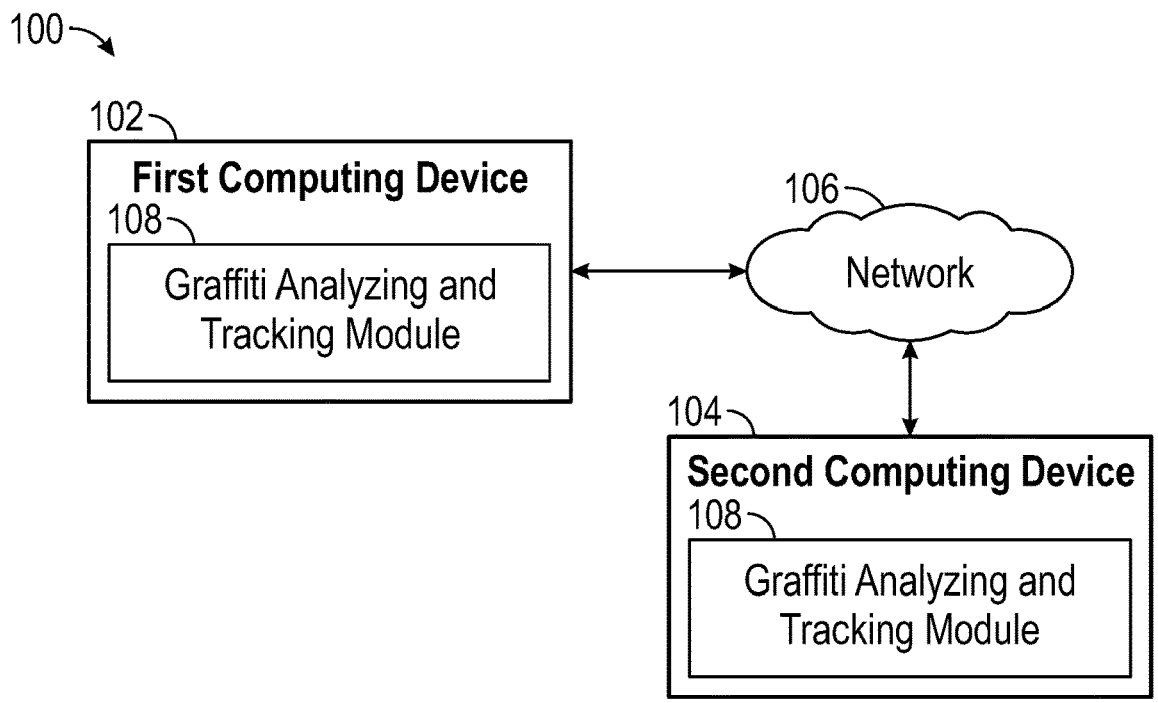
FIG. 1 is a block diagram representing a system in which aspects of the present disclosure can be implemented. Specifically.

Furthermore, the objects and advantages of this invention will become apparent from the following description and the accompanying annexed drawings.

DETAILED DESCRIPTION OF EXAMPLE EMBODIMENTS

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Referring to FIG. 1, FIG. 1 is a block diagram 100 representing a system in which aspects of the present disclosure can be implemented. Specifically, FIG. 1 depicts a schematic representation of the system for analyzing graffiti content, tracking graffiti vandals who executed the graffiti on different surfaces and report the graffiti vandal reports to law enforcement agent or public works department, in accordance with one or more exemplary embodiments. The system 100 includes a first computing device 102, and a second computing device 104 operatively coupled to each other through a network 106. The network 106 may include, but is not limited to, an Ethernet, a wireless local area network (WLAN), or a wide area network (WAN), a Bluetooth low energy network, a ZigBee network, a WIFI communication network e.g., the wireless high speed internet, or a combination of networks, a cellular service such as a 4G (e.g., LTE, mobile WiMAX) or 5G cellular data service, a RFID module, a NFC module, wired cables, such as the world-wide-web based Internet, or other types of networks may include Transport Control Protocol/Internet Protocol (TCP/IP) or device addresses (e.g. network-based MAC addresses, or those provided in a proprietary networking protocol, such as Modbus TCP, or by using appropriate data feeds to obtain data from various web services, including retrieving XML data from an HTTP address, then traversing the XML for a particular node) and so forth without limiting the scope of the present disclosure. The system 100 is preferably realized as a computer-implemented system in that the first and second computing devices (102, 104) are configured as computer-based electronic devices.

Although the first and second computing devices 102, 104 are shown in FIG. 1, an embodiment of the system 100 may support any number of computing devices. The system 100 may support only one computing device (102 or 104). The computing devices 102, 104 may include, but are not limited to, a desktop computer, a personal mobile computing device such as a tablet computer, a laptop computer, or a netbook computer, a smartphone, a video game device, a digital media player, a piece of home entertainment equipment, backend servers hosting database and other software, and so forth. Each computing device 102, 104 supported by the system 100 is realized as a computer-implemented or computer-based device having the hardware or firmware, software, and/or processing logic needed to carry out the intelligent messaging techniques and computer-implemented methodologies described in more detail herein. The first computing device 102 and/or the second computing device 104 may be configured to display features by a graffiti analyzing and tracking module 108. The features may be helpful to analyze the graffiti content and track the graffiti vandals. The graffiti vandals may include, but not limited to, an individual graffiti vandal, a graffiti author, a gang(s), an individual vandal, tagging crew(s), and so forth. The first computing device 102 may be operated by a first user and the second computing device 104 may be operated by a second user. The first user may include, but not limited to, analyst, employee, individual, user, law enforcement officer, a citizen volunteer, a public works department worker, and so forth. The second user may include, but not limited to, a law enforcement officer, public work agency, private sector in such uses as predicting trends in real property values, movements of graffiti vandals and in social studies, other entities to identify graffiti vandals, and so forth. For example, the first computing device 102 captures the graffiti and then sends the captured graffiti to the second computing device 104. Where the first computing device 102 and the second computing device 104 may be operated by the first user and the second user. The first user and the second user may be different or belong to same organization/entity.

The first computing device 102 and/or the second computing device 104 may include the graffiti analyzing and tracking module 108 which is accessed as a mobile application, web application, software that offers the functionality of mobile applications, and viewing/processing of interactive pages, for example, are implemented in the first and second computing devices 102, 104 as will be apparent to one skilled in the relevant arts by reading the disclosure provided herein. The graffiti analyzing and tracking module 108 may be downloaded from the cloud server (not shown). For example, the graffiti analyzing and tracking module 108 may be any suitable application downloaded from GOOGLE PLAY® (for Google Android devices), Apple Inc.'s APP STORE® (for Apple devices), or any other suitable database. In some embodiments, the graffiti analyzing and tracking module 108 may be software, firmware, or hardware that is integrated into the first and second computing devices 102 and 104. The graffiti analyzing and tracking module 108 may be an artificial intelligence powered, need-based, or social networking service to enable real-time analyzations (for example, graffiti image analyzation).

The first computing device 102 and/or the second computing device 104 may be configured to allow the first user and/or the second user to capture the graffiti executed on the different surfaces and upload the graffiti content to the graffiti analyzing and tracking module 108. For example, the first computing device 102 and/or the second computing device 104 are configured to facilitate the reporting by the first user and/or second user via uploads of the graffiti content. The graffiti analyzing and tracking module 108 may be configured to parse out the graffiti content into data points and then analyzes, reconfigures, and reports the data points to clearly reveal trends in categories on the first computing device 102 and/or the second computing device 104. The first computing device 102 and/or the second computing device 104 enables the graffiti analyzing and tracking module 108 to display one or more graffiti vandals and map the graffiti content to the one or more graffiti vandals that have appeared in the different graffiti renderings from the database (not shown). The mapping of graffiti content correlated with an individual graffiti vandal showing the graffiti vandal's movements and other criminal activity information.

For example, the activities of an individual graffiti vandal may be viewed over time or by geography to assist law enforcement in viewing trends and apprehending suspected graffiti vandals. The data points may include, but not limited to, call type report, removal method report, property type report, surface type report, data frequency report, total damage report, interactive mapping report, trend report, public work report, arrest report, numeric information regarding a selected report of activity, monetary damages, types of property damaged, gang affiliations, relative levels of activity between graffiti vandals (for example, individual graffiti vandals, gangs or tagging crews), and so forth. For example, the first computing device 102 and/or the second computing device 104 are also configured to carefully report the addresses of damaged property so as to show the frequency of vandalism of a specific property and to show possible expansions of claimed graffiti vandal(s) territory.

For example, the first user and/or the second user performs the first thing when he sees the graffiti that is to determine if it is a gang graffiti or tagging graffiti. If it is a gang graffiti, then the first user and/or the second user identifies the gang based off of the graffiti rendering. The reason why it is important to identify the type of graffiti is because each graffiti is led by a different motivation. A tagger's motivation is for fame and notoriety.

If the graffiti content is "publicity" gang graffiti, then this is just the gang name in the graffiti rendering and nothing else. For example, an image with "Carson 13" written (although usually gangs abbreviate it so in the example it would be CX3). If the graffiti content is "roll call" gang graffiti, then this may be the gang name and then the moniker or monikers listed along with the gang name. The first user and/or the second user identifies the rendering as "Roll Call" and enters the gang name and the moniker or monikers contained in the graffiti renderings. The graffiti analyzing and tracking module 108 may be configured to show which gang members put their graffiti up together, the graffiti analyzing and tracking module 108 may link the one or more monikers that have appeared together in the different renderings. So for example, let's say the gang graffiti said "CX3" and then also contained the monikers: snoopy, shorty, and loco. The analyst may enter that information and then the graffiti analyzing and tracking module 108 may link them together for future search capabilities.

If the graffiti content is "territorial" gang graffiti then the gang graffiti may in some way be illustrating a territory. This may be accomplished by things such as an arrow pointing down or sometimes with written words such as "CX3 Hood. Others stay out."

If the graffiti content is "Threatening" gang graffiti then the gang graffiti may in some way send a threat to either a rival gang, a rival gang member, the public, or to law enforcement. This is typically done through a common gang lexicon of either writing "187" or then whoever the threat is directed at. For example if Carson 13 were to send a threat to law enforcement they might right "CX3. 187 pigs" Other examples may be writing another gang name up and putting a "K" next to the rival gang's name to indicate "Killer." Also, they may write another gangs name up and cross it out. If graffiti content is "Sympathetic" gang graffiti then usually this takes the form of a "RIP" (Rest in Peace) for a fellow gang member that was killed.

The graffiti analyzing and tracking module 108 may be configured to prepare and display the one or more reports on the first computing device 102 and/or the second computing device 104 to assist the users with the apprehension of graffiti vandals as well as the inspection of individual graffiti messages. The graffiti analyzing and tracking module 108 may also be configured to track the ongoing crimes, prosecute and seek restitution from such vandals on the first computing device 102 and/or the second computing device 104. The users are able to seamlessly inspect selected graffiti information to provide the graffiti information in discerning criminal trends and decoding cyphered messages. For example, in certain ethnicities, the use of a backwards "E" or "N" is known with such knowledge assisting in decoding a message. Moreover, the use of the number "13" is sometimes used in Hispanic gangs to indicate the thirteenth letter in the alphabet "H" which may mean "Hispanic" or have a Hispanic connotation.

The graffiti analyzing and tracking module 108 may be configured to facilitate the careful review of graffiti to ascertain the type of graffiti presented wherein such types of graffiti may include, but not limited to, territorial graffiti, threatening graffiti, roll call graffiti, propaganda graffiti, sympathy graffiti, publicity graffiti, and so forth. The graffiti analyzing and tracking module 108 may also be configured to categorize the graffiti on the first computing device 102 and/or the second computing device 104 by ethnicity and writing styles. Furthermore, the study and analysis of graffiti may be taken to the granular level of different surfaces. The different surfaces may include, but not limited to, walls, curbs, poles, benches, trees, electrical boxed, mail boxes, fences, rocks, street signs, vehicles, and so forth. The graffiti analyzing and tracking module 108 may also be configured to track the graffiti vandals on the first computing device 102 and/or the second computing device 104, where the graffiti vandals may include the taggers who apply graffiti but who are not necessarily affiliated with any criminal organization or criminal activity beyond vandalism.

Figure 2:
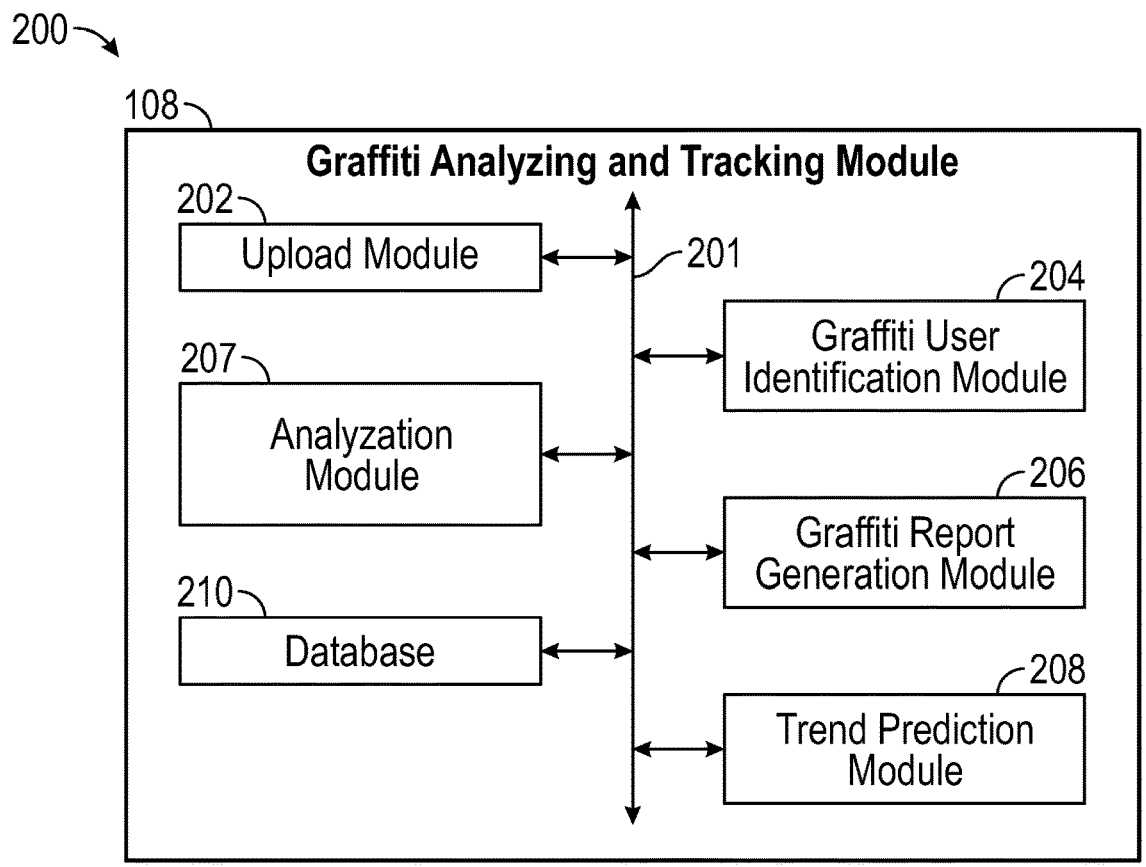
FIG. 2 is a block diagram depicting a schematic representation of the graffiti analyzing and tracking module shown in FIG. 1, in accordance with one or more exemplary embodiments.

Referring to FIG. 2 is a block diagram 200 depicting a schematic representation of the graffiti analyzing and tracking module 108 shown in FIG. 1, in accordance with one or more exemplary embodiments. The graffiti analyzing and tracking module 108 may include a bus 201, an upload module 202, a graffiti user identification module 204, a graffiti report generation module 206, an analyzation module 207, a trend prediction module 208, and a database 210. The bus 201 may include a path that permits communication among the modules of the graffiti analyzing and tracking module 108. The term "module" is used broadly herein and refers generally to a program resident in memory of the computing device 102 or 104.

The upload module 202 may be configured to upload the graffiti content from the first computing device 102 and/or the second computing device 104. For example, the users are enabled to upload the graffiti content from the first computing device 102 and/or the second computing device 104. The analyzation module 207 may be configured to parse out the graffiti content into data points and then analyzes, reconfigures, and reports the data points to clearly reveal trends in the categories on the first computing device 102 and/or the second computing device 104. The analyzation module 207 may be configured to analyze the graffiti content to find trends in the graffiti and the graffiti vandal activity. The graffiti vandal activity may include, but not limited to, a gang activity, gangs activities, an individual graffiti vandal activity, individual graffiti vandal activities, and so forth.

The graffiti user identification module 204 may be configured to use each graffiti content's GPS coordinates to plot graffiti incidents on an interactive map. The graffiti user identification module 204 may also be configured to enable the users to view activity from individual graffiti vandals or specific crews or gangs. The graffiti user identification module 204 may also be configured to identify the path of damage, trends or movements related to graffiti on the different surfaces. The graffiti report generation module 206 may be configured to instantly generate reports that show the most active taggers and graffiti vandals. The generated reports may include, categories which many not be limited to, call type report, removal method report, property type report, surface type report, data frequency report, total damage report, interactive mapping report, trend report, public work report, arrest report, numeric information regarding a selected report of activity, and so forth. The reports may include, but not limited to, pie charts, donut charts, column charts, text index reports, graphs, and so forth.

The generated reports may show most active taggers and graffiti vandal(s). The graffiti report generation module 206 may also be configured to allow the users to access vital information such as the name of the moniker or crew, total square feet of damage, surface type and location for each incident on the first computing device 102 and/or the second computing device 104. The graffiti report generation module 206 may also be configured to compare the frequency of graffiti vandalism over a specific period of time on the first computing device 102 and/or the second computing device 104. The trend prediction module 208 may be configured to accept the graffiti content and to correlate and analyze such content to find trends in the graffiti and the graffiti vandal activity. For example, the trend prediction module 208 predicts the trends in real property values, movement of graffiti vandal and in social studies.

The database 210 may be configured to store all information about graffiti renderings, graffiti crimes, and locations and allows the users to allocate resources accordingly. The database 210 may also contain information of graffiti by the vandal's tag or crew and location in order to connect incidents and create a complete profile of activity by tagger and crew. The database 210 may also be configured to link graffiti vandals to multiple incidents and increase the amount of restitution collected.

Figure 3:
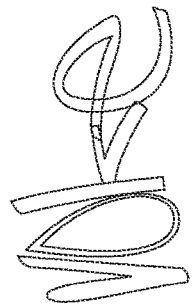
FIG. 3 is an example diagram depicting a graffiti report, in accordance with one or more exemplary embodiments.

Referring to FIG. 3 is an example diagram 300 depicting a graffiti report, in accordance with one or more exemplary embodiments. The graffiti report 300 includes a graffiti content 301, data points 303, an edit option 305, a delete option 307, a map view option 309, and a map all option 311, a report option 313, and an export report option 315. The graffiti content 301 is not limited to words, it may include, series of numbers, codes, flower image(s), animal image(s), and so forth.

The data points 303 may include moniker, incident identity, square footage, surface type, uploaded date, date removed, removal method, and camera type, analyzed by person name, analyzed on which date, abatement crew, property type, suspect's moniker, agency, arrested date, file number, suspect's first name, suspect's date of birth, suspect's town of residence, officer's email, and so forth. The edit option 305 may be configured to enable the user to edit the data points 303 and the delete option 307 may be configured to enable the user to delete the data points 303. If the user selects the map view option 309, then the user views the approximate location of the graffiti on the map. The graffiti report 300 further includes total number of incidents, total square feet, and restitution.

Figure 4:
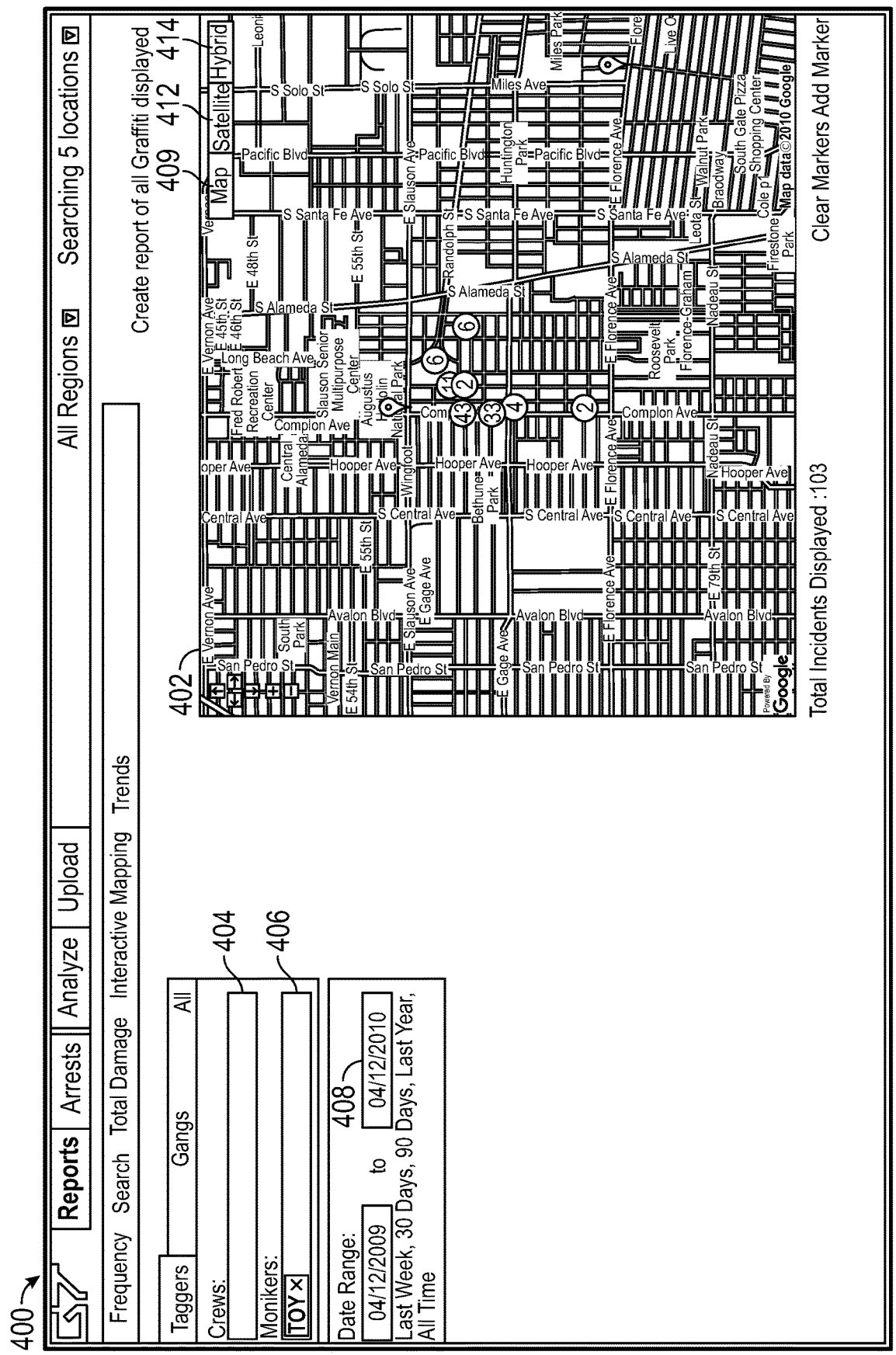
FIG. 4 is an example diagram depicting a map of vandalized locations with the reported locations constrained by a user selected date range and selected moniker, in accordance with one or more exemplary embodiments.

Referring to FIG. 4 is an example diagram 400 depicting a map of vandalized locations with the reported locations constrained by a user selected date range and selected moniker, in accordance with one or more exemplary embodiments. The graffiti analyzing and tracking module 108 may be configured to use each media content's GPS coordinates to plot graffiti incidents on an interactive map 402. The diagram 400 includes a crew option 404, a moniker option 406, and a date range option 408. The diagram 400 further includes the map view option 409, a satellite view option 412, and a hybrid view option 414 on the interactive map 402.

The crew option 404 may be configured enable the user to provide crew name or names and the moniker option 406 may be configured enable the user to provide the monikers. The crew option 404 and the moniker option 406 may be configured to narrow the search to view activity from individual graffiti vandals. The date range option 408 may be configured to enable the user to select period of time i.e., a date range. For example, the date range may include, but not limited to, 7 days, 30 days, 2-4 months, 30 days, 90 days, one year, and so forth. The map view option 409 may be configured to enable the user to view the vandalized locations with the reported locations on the interactive map 402. The satellite view option 412 may be configured to enable the user to view the satellite view on the computing device 102 or 104, where the computing device 102 or 104 displays the graffiti incidents with a satellite view. The hybrid view option 414 may be configured to enable the user to view hybrid image on the computing device 102 or 104, where the computing device 102 or 104 displays a hybrid combination of a satellite image and the corresponding interactive map 402. The interactive map 402 may allow the user to identify the path damage, trends or movements related to the graffiti on the computing device 102 or 104.

Figure 5:
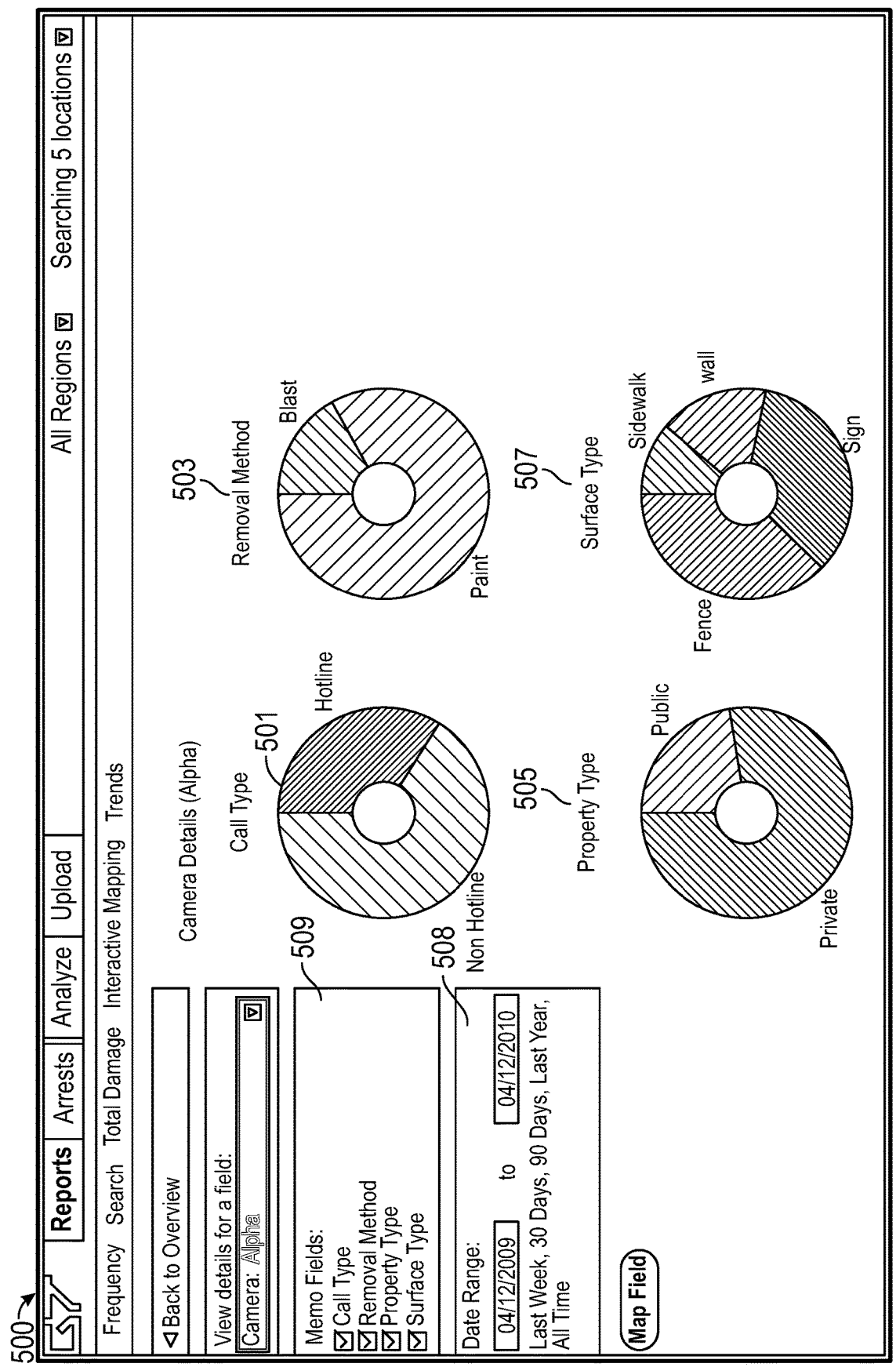
FIG. 5 is an example diagram depicting pie charts, in accordance with one or more exemplary embodiments.

Referring to FIG. 5 is an example diagram 500 depicting pie charts, in accordance with one or more exemplary embodiments. The pie charts 500 include types of data points displayed on the computing device 102 or 104 by the graffiti analyzing and tracking module 108. The types of data points such as a call type 501, a removal method type 503, a property type 505, and a surface type 507. Each type 501, 503, 505, 507 includes segments, where each segment is filled with a different color or grey scale. Each segment may be identified by a label such as segment 1, segment 2, and segment 3.

The call type 501 includes the hotline segment and non-hotline segment. The removal method type 503 includes the blast segment and the paint segment. The property type 505 includes the private property segment and the private property segment. The surface type 507 includes a fence segment, a sidewalk segment, a wall segment, and a sign segment. The database 210 may be configured to store all segments information about graffiti crimes. The graffiti analyzing and tracking module 108 may be configured to utilize the segment information to allocate resources accordingly. The graffiti analyzing and tracking module 108 may also be configured to link vandals to multiple incidents and increase the amount of restitution collected. The example diagram 500 further includes a memo field option 509, and the date range option 508. The memo field option 509 may be configured to enable the user to select required field and then that selected pie chart displayed on the computing device 102 or 104. The date range option 508 may be configured to enable the user to select the date range.

Figure 6:
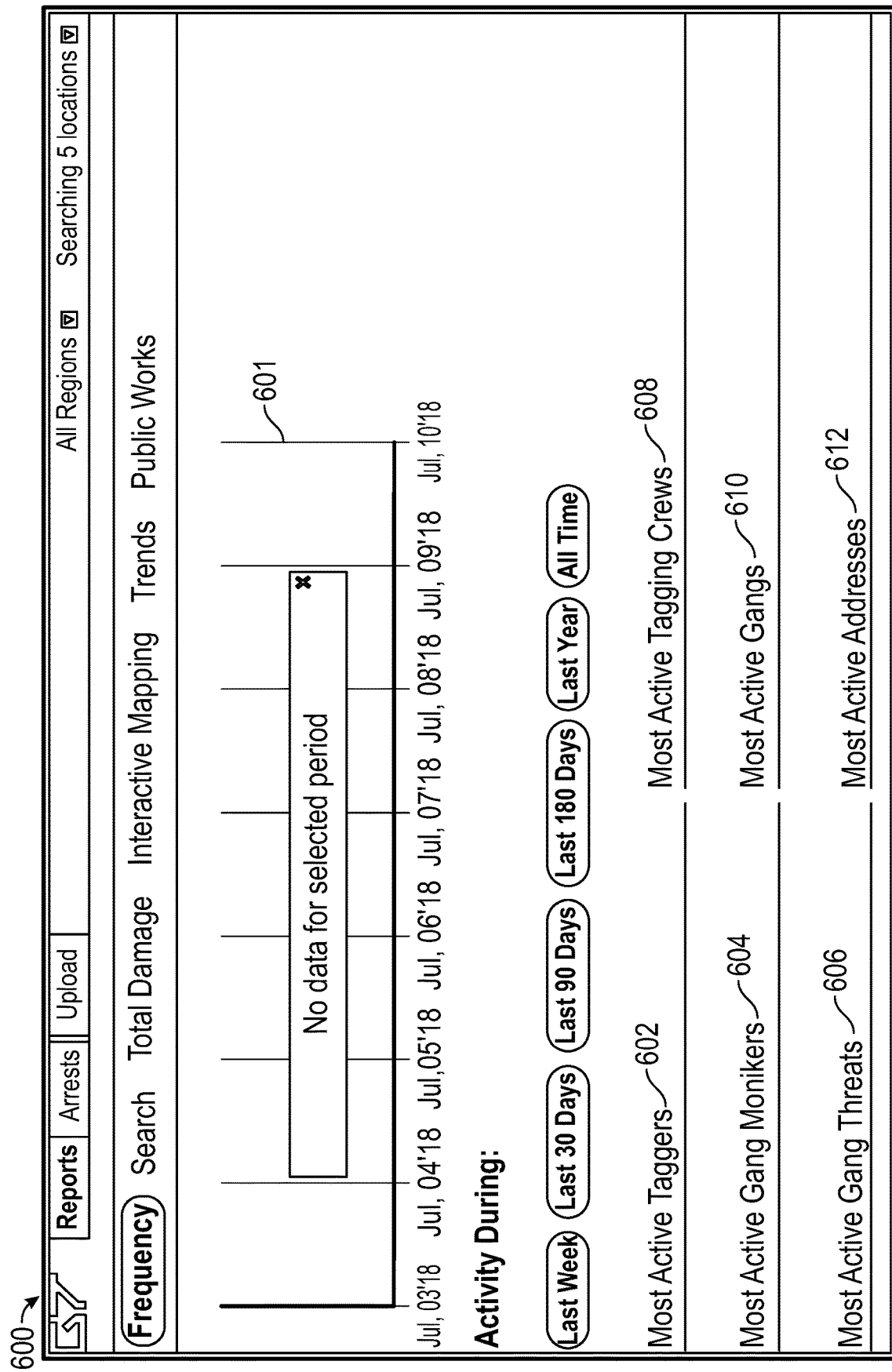
FIG. 6 is an example diagram depicting an interface of available activity reports on the computing device, in accordance with one or more exemplary embodiments.

Referring to FIG. 6 is an example diagram 600 depicting an interface of available activity reports on the computing device 102 or 104, in accordance with one or more exemplary embodiments. The example diagram 600 includes a graph 601. The graph 601 represents the information regarding a selected category of activity in accordance with the date range. For example, the graph 601 represents the comparison of graffiti vandalism frequency over a specific period of time. But, here, the graph 601 represents such as "no data for selected period".

The graffiti analyzing and tracking module 108 may be configured to provide links 602, 604, 606, 608, 610 and 612 on the computing device 102 or 104. The links 602, 604, 606, 608, 610 and 612 represent most active taggers, most active gang monikers, most active gang threats, most active tagging crews, most active gangs, and most active addresses respectively. The interface screen 600 may also include duration of an activity. The duration of the activity may include, but not limited to, last week activity, last 30 days activity, last 90 days activity, last 180 days activity, last year activity, all time activity, and so forth.

Figure 7:
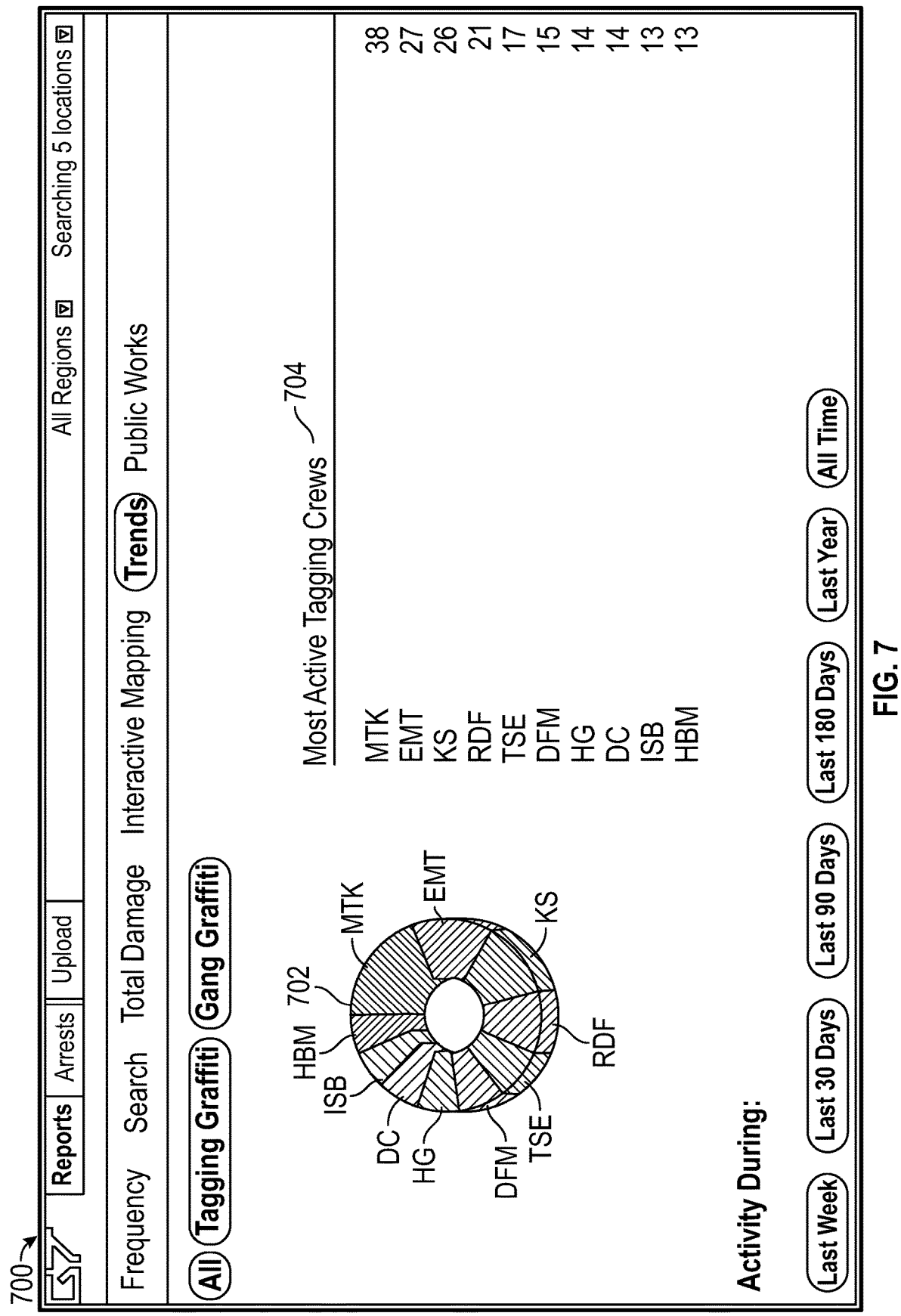
FIG. 7 is an example diagram depicting the pie chart and the text index report, in accordance with one or more exemplary embodiments.

Referring to FIG. 7 is an example diagram 700 depicting the pie chart and the text index report, in accordance with one or more exemplary embodiments. The pie chart 702 includes segments, where each segment is filled with the different color or grey scale. The text index report 704 includes names of most active tagging crews and also number of activities. The pie chart 702 and the text index report 704 may delineate the most active of tagging crews during a selected time period. The pie chart 702 and the text index report 704 may show the most active taggers and gangs. The graffiti analyzing and tracking module 108 may be configured to enable the users to access vital information, such as the name of the moniker or crew, total square feet of damage, surface type and location for each incident concerning the vandalism by the graffiti vandals.

Figure 8:
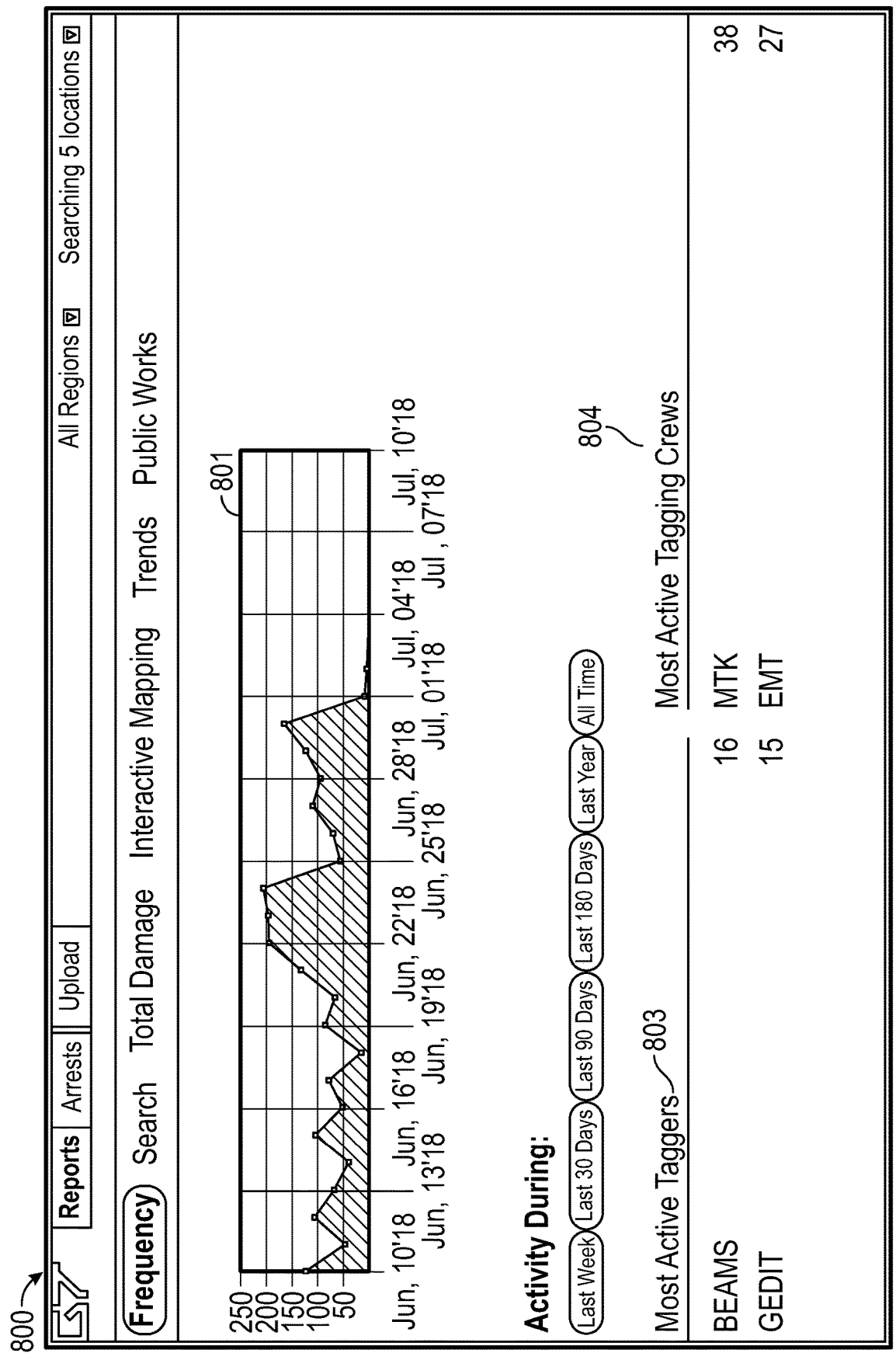
FIG. 8 is an example diagram depicting a graphical representation and numeric information regarding a selected category of activity, in accordance with one or more exemplary embodiments.

Referring to FIG. 8 is an example diagram 800 depicting a graphical representation and numeric information regarding a selected category of activity, in accordance with one or more exemplary embodiments. The graph 801 represents the information regarding a selected category of activity in accordance with the date range. For example, the graph 801 represents the comparison of graffiti vandalism frequency over a specific period of time. The graph 801 describes the total amount of damage done by most active taggers 803 belonging to their respective most active tagging crews 804 to enable searching and mapping the vandalism trends across a specific range of time as per the user's requirement. Further, information with respect to the damage caused by the graffiti vandals is also obtained i.e., whether the graffiti was found on public property or private property etc. The numeric information 803 includes most active taggers, and most active tagging crews. The most active taggers 803, and most active tagging crews 804 may include beams activities (for example, 16 activities), GEDIT activities (for example, 15 activities), MTK activities (for example, 38 activities), and EMT activities (for example, 27 activities).

Disclosed interfaces include means of generating reports with such reports including data regarding frequency, total damage, interactive mapping, trends, public works, arrests and other categories.

The disclosed embodiments are scalable to all sizes of cities or areas. The disclosed embodiments may be leased or otherwise monetized for each subscribing jurisdiction.

Figure 9:
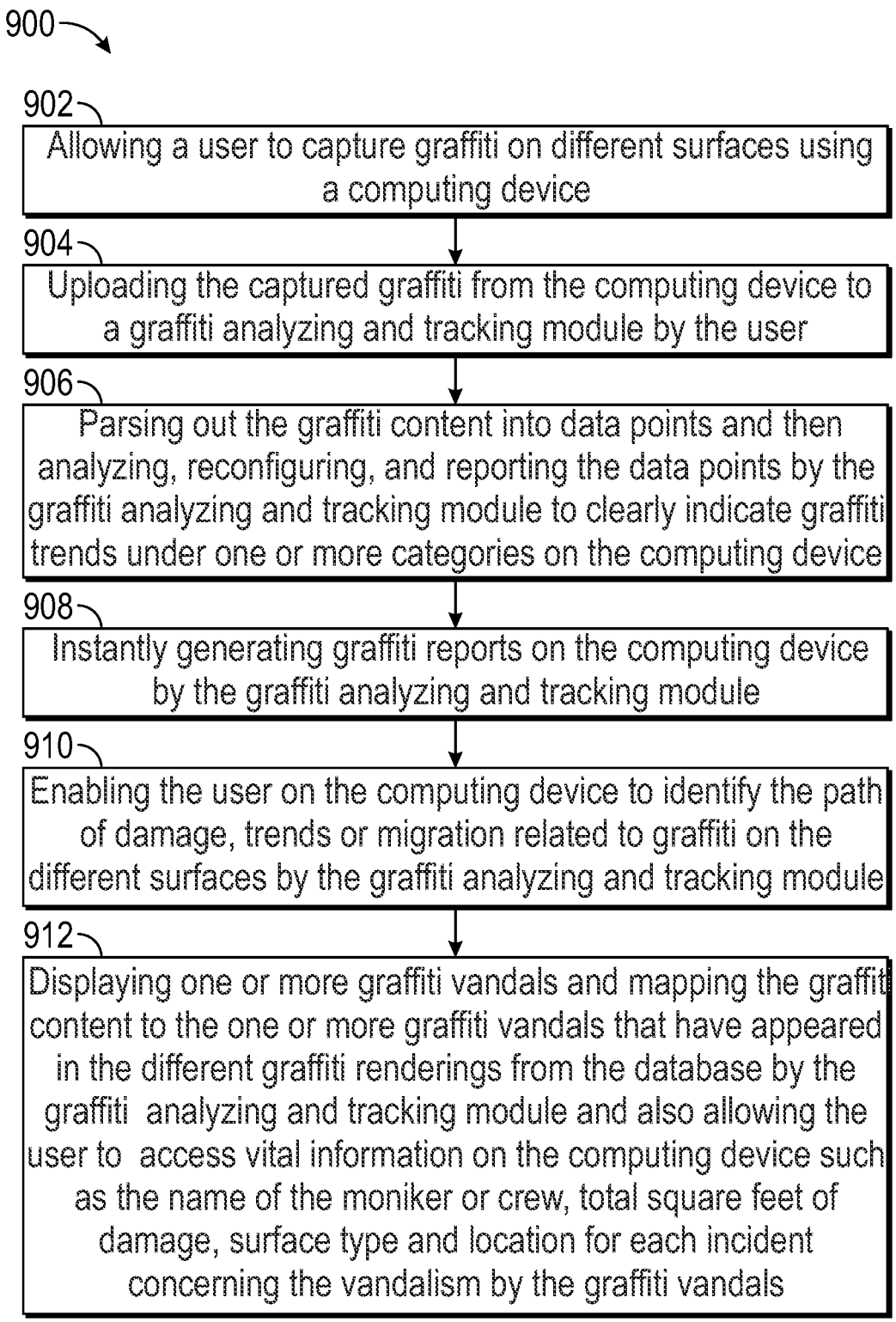
FIG. 9 is an example flow diagram depicting a method for analyzing graffiti and tracking graffiti vandals, in accordance with one or more exemplary embodiments.

Referring to FIG. 9, FIG. 9 is an example flow diagram 900 depicting a method for analyzing graffiti and tracking graffiti vandals, in accordance with one or more exemplary embodiments. The method 900 may be carried out in the context of the details of FIG. 1, FIG. 2, FIG. 3, FIG. 4, and FIG. 5, FIG. 6, FIG. 7, and FIG. 8. However, the method 900 may also be carried out in any desired environment. Further, the aforementioned definitions may equally apply to the description below.

The method commences at step 902, the user is allowed to capture the graffiti on different surfaces using the computing device. Thereafter, at step 904, the user uploads the captured graffiti from the computing device to the graffiti analyzing and tracking module. Thereafter, at step 906, the graffiti analyzing and tracking module parses out the graffiti content into data points and then analyzes, reconfigures, and reports the data points to clearly indicate trends in the categories on the computing device. Thereafter, at step 908, the graffiti analyzing and tracking module instantly generates graffiti reports on the computing device. Thereafter, at step 910, the graffiti analyzing and tracking module enables the user on the computing device to identify the path of damage, trends or movements related to the graffiti on the different surfaces. Thereafter, at step 912, the graffiti analyzing and tracking module displays the one or more graffiti vandals and maps the graffiti content to one or more graffiti vandals that have appeared in the different graffiti renderings from the database and also allowing the user to access vital information on the computing device such as the name of the moniker or crew, total square feet of damage, surface type and location for each incident concerning the vandalism by the graffiti vandals. The one or more graffiti vandals may include, but not limited to, most active taggers, gangs, individual graffiti vandals, and so forth. The vital information on the computing device such as the name of gang or crew, total square feet of damage, surface type and location for each incident.

Figure 10:
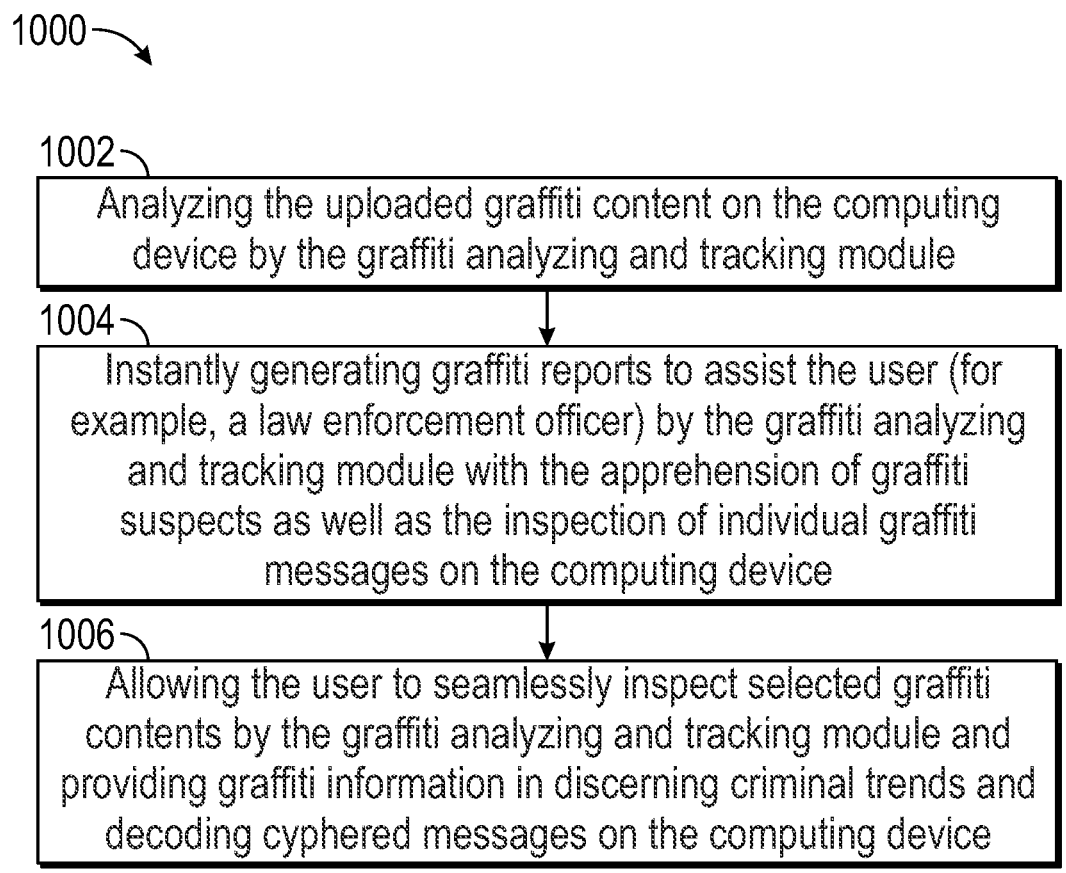
FIG. 10 is an example flow diagram depicting a method for providing the graffiti information in discerning criminal trends and decoding cyphered messages, in accordance with one or more exemplary embodiments.

Referring to FIG. 10, FIG. 10 is an example flow diagram 1000 depicting a method for providing the graffiti information in discerning criminal trends and decoding cyphered messages, in accordance with one or more exemplary embodiments. The method 1000 may be carried out in the context of the details of FIG. 1, FIG. 2, FIG. 3, FIG. 4, and FIG. 5, FIG. 6, FIG. 7, FIG. 8, and FIG. 9. However, the method 1000 may also be carried out in any desired environment. Further, the aforementioned definitions may equally apply to the description below.

The graffiti analyzing and tracking module analyzes the uploaded graffiti content on the computing device, at step 1002. Thereafter, at step 1004, the graffiti analyzing and tracking module instantly generates the graffiti reports to assist the user (for example, law enforcement officer) with the apprehension of graffiti vandals as well as the inspection of individual graffiti messages on the computing device. Thereafter, at step 1006, the graffiti analyzing and tracking module allows the user to seamlessly inspect selected graffiti contents provide graffiti information in discerning criminal trends and decoding cyphered messages on the computing device.

Figure 11:
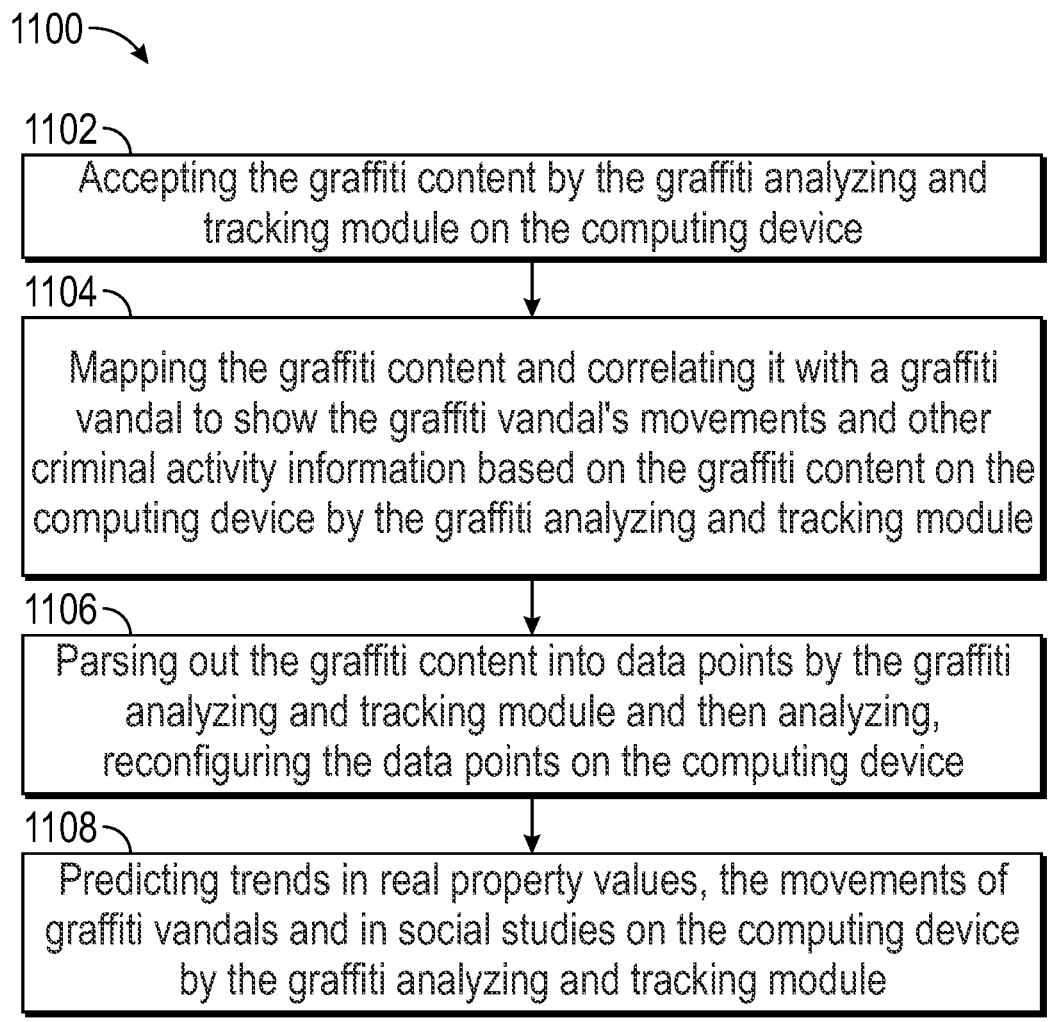
FIG. 11 is an example flow diagram depicting a method for correlating and analyzing graffiti content to find/predict trends in the graffiti and the graffiti vandal, in accordance with one or more exemplary embodiments.

Referring to FIG. 11, FIG. 11 is an example flow diagram 1100 depicting a method for correlating and analyzing graffiti content to find/predict trends in the graffiti and the graffiti vandal activity, in accordance with one or more exemplary embodiments. The method 1000 may be carried out in the context of the details of FIG. 1, FIG. 2, FIG. 3, FIG. 4, and FIG. 5, FIG. 6, FIG. 7, FIG. 8, and FIG. 9. However, the method 1100 may also be carried out in any desired environment. Further, the aforementioned definitions may equally apply to the description below.

The graffiti analyzing and tracking module accepts the graffiti content on the computing device, at step 1102. Thereafter, at step 1104, the graffiti analyzing and tracking module maps the graffiti content and correlates it with a graffiti vandal to show the graffiti vandal's movements and other criminal activity information based on the graffiti content on the computing device. Thereafter, at step 1106, the graffiti analyzing and tracking module parses out the graffiti content into data points and then the analyzes, reconfigures the data points on the computing device. Thereafter, at step 1108, the graffiti analyzing and tracking module predicts trends in real property values, movements of graffiti vandal(s) and in social studies on the computing device. Here, the trends may be shown in a variety of categories. Thus, the system and their accompanying methods helps to discern useful graffiti vandalism trends caused by the graffiti vandals.

Figure 12:
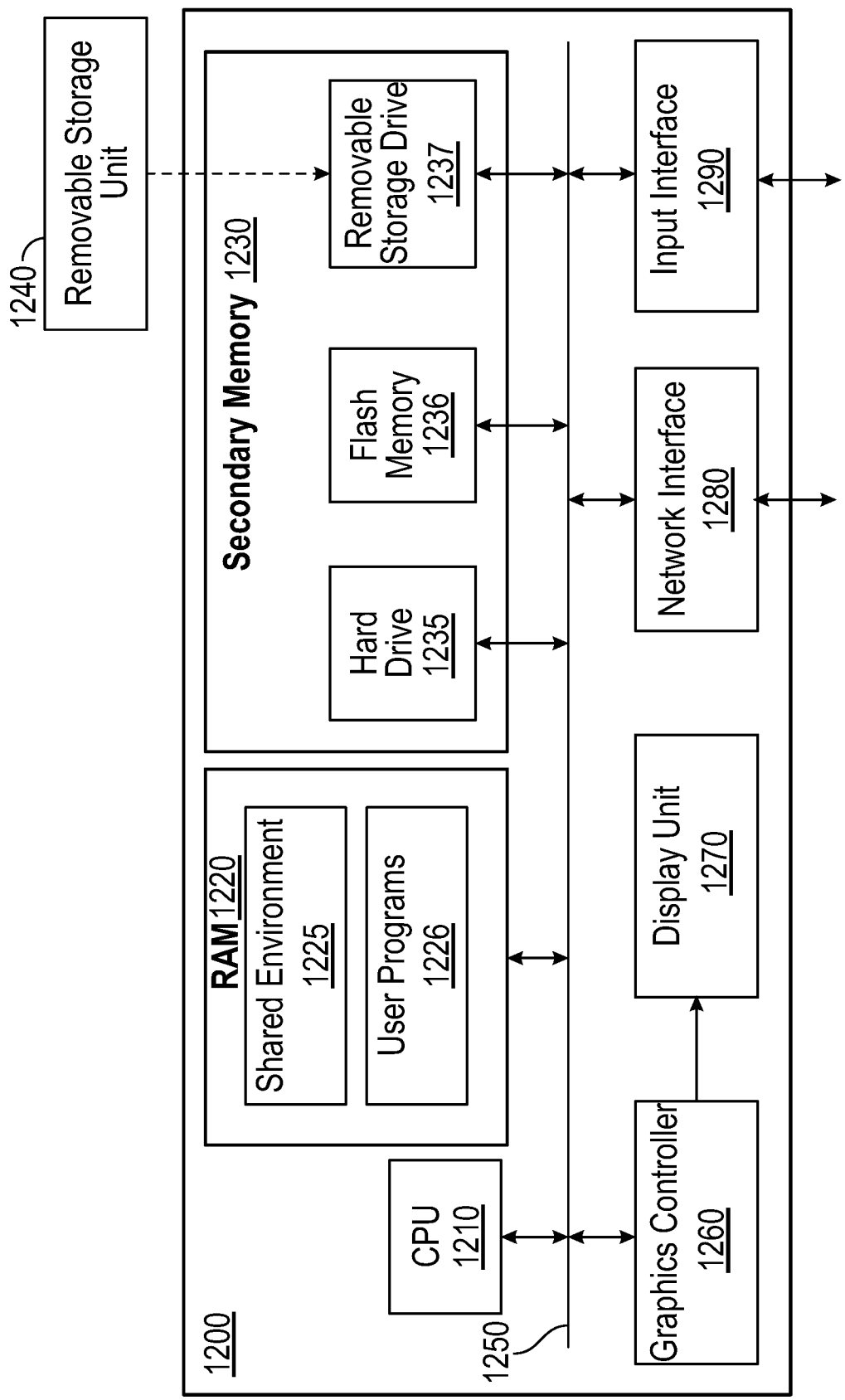

Referring to FIG. 12, FIG. 12 is a block diagram illustrating the details of digital processing system 1200 in which various aspects of the present disclosure are operative by execution of appropriate software instructions. Digital processing system 1200 may correspond to the first computing device 102 and the second computing device 104 (or any other system in which the various features disclosed above can be implemented).

Digital processing system 1200 may contain one or more processors such as a central processing unit (CPU) 1210, random access memory (RAM) 1220, secondary memory 1227, graphics controller 1260, display unit 1270, network interface 1280, an input interface 1290. All the components except display unit 1270 may communicate with each other over communication path 1250, which may contain several buses as is well known in the relevant arts. The components of FIG. 12 are described below in further detail.

CPU 1210 may execute instructions stored in RAM 1220 to provide several features of the present disclosure. CPU 1210 may contain multiple processing units, with each processing unit potentially being designed for a specific task. Alternatively, CPU 1210 may contain only a single general-purpose processing unit.

RAM 1220 may receive instructions from secondary memory 1230 using communication path 1250. RAM 1220 is shown currently containing software instructions, such as those used in threads and stacks, constituting shared environment 1225 and/or user programs 1226. Shared environment 1225 includes operating systems, device drivers, virtual machines, etc., which provide a (common) run time environment for execution of user programs 1226.

Graphics controller 1260 generates display signals (e.g., in RGB format) to display unit 1270 based on data/instructions received from CPU 1210. Display unit 1270 contains a display screen to display the images defined by the display signals. Input interface 1290 may correspond to a keyboard and a pointing device (e.g., touch-pad, mouse) and may be used to provide inputs. Network interface 1280 provides connectivity to a network (e.g., using Internet Protocol), and may be used to communicate with other systems (such as those shown in FIG. 1, network 106) connected to the network.

Secondary memory 1230 may contain hard drive 1235, flash memory 1236, and removable storage drive 1237. Secondary memory 1230 may store the data software instructions (e.g., for performing the actions noted above with respect to the Figures), which enable digital processing system 1200 to provide several features in accordance with the present disclosure.

Some or all of the data and instructions may be provided on the removable storage unit 1240, and the data and instructions may be read and provided by removable storage drive 1237 to CPU 1210. Floppy drive, magnetic tape drive, CD-ROM drive, DVD Drive, Flash memory, a removable memory chip (PCMCIA Card, EEPROM) are examples of such removable storage drive 1237.

The removable storage unit 1240 may be implemented using medium and storage format compatible with removable storage drive 1237 such that removable storage drive 1237 can read the data and instructions. Thus, removable storage unit 1240 includes a computer readable (storage)

medium having stored therein computer software and/or data. However, the computer (or machine, in general) readable medium can be in other forms (e.g., non-removable, random access, etc.).

In this document, the term "computer program product" is used to generally refer to the removable storage unit 1240 or hard disk installed in hard drive 1235. These computer program products are means for providing software to digital processing system 1200. CPU 1210 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1230. Volatile media includes dynamic memory, such as RAM 1220. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1250. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and subcombinations of the various features described hereinabove as well as variations and modifications thereof, which would occur to persons skilled in the art upon reading the foregoing description.

What is claimed is:

1. A system for analyzing graffiti and tracking graffiti vandals, comprising:
   a computing device is configured to allow a user to capture graffiti executed on a plurality of surfaces and upload the captured graffiti to a graffiti analyzing and tracking module, whereby the graffiti analyzing and tracking module parses out the graffiti content into a plurality of data points and then analyzes, reconfigures, and creates one or more reports, wherein at least one report comprises the plurality of data points to reveal trends in one or more categories on the computing devices, a graffiti content, and a decoded graffiti message that is cyphered in the graffiti content; and
   a database is configured to store information corresponding to at least one of: graffiti renderings; graffiti crimes; locations; and allows the user to allocate resources, whereby the computing device enables the graffiti analyzing and tracking module to display one or more graffiti vandals and map the graffiti content to the one or more graffiti vandals that have appeared in the graffiti renderings from the database, whereby the mapping of graffiti content is correlated with a graffiti vandal showing the graffiti vandal's movements and criminal activity information by the graffiti analyzing and tracking module.

2. The system of claim 1, wherein the computing device is further configured to assist the user to identify at least one of: the one or more graffiti vandals; track ongoing crimes; prosecute and seek restitution from the one or more graffiti vandals by the graffiti analyzing and tracking module.

3. The system of claim 1, wherein the computing device is configured to correlate and analyze the graffiti content to find the trends in the graffiti and the graffiti vandal activity by the graffiti analyzing and tracking module.

4. The system of claim 1, wherein the computing device is further configured to track the one or graffiti vandals who apply the graffiti but who are not necessarily affiliated with any criminal organization or criminal activity beyond vandalism by the graffiti analyzing and tracking module.

5. The system of claim 1, wherein the computing device is configured to display one or more graffiti reports to assist the user with apprehension of graffiti vandals as well as inspection of individual graffiti messages.

6. A computer-implemented method for analyzing graffiti and tracking graffiti vandals, comprising:
   allowing a user to capture graffiti executed on a plurality of surfaces using a computing device and uploading the captured graffiti to a graffiti analyzing and tracking module by the user from the computing device;
   parsing out the graffiti content into a plurality of data points by the graffiti analyzing and tracking module and then analyzing, reconfiguring, and creating one or more reports, wherein at least one reports comprises the plurality of data points to reveal trends in one or more categories on the computing device, a graffiti content, and a decoded graffiti message that is cyphered in the graffiti content; and
   enabling the user on the computing device to identify the path of damage, trends or movements related to the graffiti on the plurality of surfaces by the graffiti analyzing and tracking module; and
   displaying one or more graffiti vandals and map the graffiti content to the one or more graffiti vandals that have appeared in graffiti renderings from a database and allowing the user to access vital information on the computing device such as the name of a moniker or a crew, total square feet of damage, a surface type and a location for each incident concerning vandalism by the one or more graffiti vandals.

7. The method of claim 6, wherein the graffiti analyzing and tracking module analyzes the graffiti content and instantly generates the reports to assist the user with apprehension of graffiti vandals as well as inspection of individual graffiti messages on the computing device.

8. The method of claim 6, wherein the graffiti analyzing and tracking module allows the user to seamlessly inspect the selected graffiti content to provide graffiti information in discerning criminal trends and decoding cyphered messages on the computing device.

9. A computer program product comprising a non-transitory computer-readable medium having a computer-readable program code embodied therein to be executed by one or more processors, said program code including instructions to:
   allow a user to capture graffiti executed on a plurality of surfaces using a computing device and upload the captured graffiti to a graffiti analyzing and tracking module by the user from the computing device;
   parse out the graffiti content into a plurality of data points by the graffiti analyzing and tracking module and then analyze, reconfigure, and create one or more reports, wherein the at least one report comprises the plurality of data points to indicate trends in one or more categories on the computing device a graffiti content, and a decoded graffiti message that is cyphered in the graffiti content;
   enable the user on the computing device to identify the path of damage, trends or movements related to the graffiti on the plurality of surfaces by the graffiti analyzing and tracking module; and
   display one or more graffiti vandals and map the graffiti content to the one or more graffiti vandals that have appeared in graffiti renderings from a database and allow the user to access vital information on the computing device such as the name of a moniker or a crew, total square feet of damage, a surface type and a location for each incident concerning vandalism by the one or more graffiti vandals.

10. The computer program product of claim 9, wherein the graffiti analyzing and tracking module comprises an upload module configured to upload the graffiti content from the computing device.

11. The computer program product of claim 9, wherein the graffiti analyzing and tracking module comprises an analyzation module configured to analyze the graffiti content to find trends in the graffiti and the graffiti vandal activity on the computing device.

12. The computer program product of claim 9, wherein the graffiti analyzing and tracking module comprises a graffiti user identification module configured to use each graffiti content's GPS coordinates to plot graffiti incidents on an interactive map on the computing device.

13. The computer program product of claim 12, wherein the graffiti user identification module is also configured to identify the path of damage, trends or movements related to the graffiti executed on the plurality of surfaces.

14. The computer program product of claim 9, wherein the graffiti analyzing and tracking module comprises a graffiti report generation module configured to instantly generate the one or more reports.

15. The computer program product of claim 14, wherein the graffiti report generation module is also configured to compare a frequency of graffiti vandalism over a specific period of time on the computing device.

16. The computer program product of claim 9, wherein the graffiti analyzing and tracking module comprises a trend prediction module configured to accept the graffiti content and to correlate and analyze such content to find trends in the graffiti and the graffiti vandal activity.

17. The computer program of claim 9, wherein the one or more reports further comprise data points, a delete option, a map view option, a report option, and a map all option.

18. The computer program of claim 9, wherein the data points comprise a moniker, an incident identity, a square footage, a surface type, an upload date, a date of removal, a removal method, an abatement crew, a property type, a suspect's moniker, an agency, an arrest date, a file number, a suspect's first name, a suspect's date of birth, a suspect's town of residence, and a user's email address.

19. The system of claim 1, wherein the one or more reports further comprise: data points, a delete option, a map view option, a report option, and a map all option.

20. The system of claim 19, wherein the data points comprise a moniker, an incident identity, a square footage, a surface type, an upload date, a date of removal, a removal method, an abatement crew, a property type, a suspect's moniker, an agency, an arrest date, a file number, a suspect's first name, a suspect's date of birth, a suspect's town of residence, and a user's email address.

* * * * *